US012156838B2

(12) United States Patent
Morgan

(10) Patent No.: US 12,156,838 B2
(45) Date of Patent: Dec. 3, 2024

(54) ANTI-ROLLBACK DEVICE FOR USE WITH A COLLAPSIBLE WHEELCHAIR

(71) Applicant: Direct Supply, Inc., Milwaukee, WI (US)

(72) Inventor: Justin T. Morgan, Cedarburg, WI (US)

(73) Assignee: Direct Supply, Inc., Milwaukee, WI (US)

( * ) Notice: Subject to any disclaimer, the term of this patent is extended or adjusted under 35 U.S.C. 154(b) by 541 days.

(21) Appl. No.: 17/493,339

(22) Filed: Oct. 4, 2021

(65) Prior Publication Data

US 2023/0105325 A1 Apr. 6, 2023

(51) Int. Cl.
*A61G 5/14* (2006.01)
*A61G 5/08* (2006.01)
*A61G 5/10* (2006.01)

(52) U.S. Cl.
CPC .......... *A61G 5/1086* (2016.11); *A61G 5/0825* (2016.11)

(58) Field of Classification Search
CPC ...... A61G 5/1086; A61G 5/0825; A61G 5/14; A61G 5/1054; A61G 5/1059; A61G 2200/36; A61G 5/1035; A61G 5/10; A61G 5/101; A61G 5/1089; A61G 5/128; A61G 2200/34; A61G 5/08; A61G 5/02; A61G 5/022; A61G 5/043; A61G 5/1021; A61G 5/1024; A61G 5/1029; A61G 5/1037; A61G 5/1091; A61G 7/10; Y10S 297/10; Y10S 297/04; Y10S 180/907; Y10S 414/134; B60N 2/10; B62B 2005/0471; B62B 5/0404
USPC .......................................................... 280/650
See application file for complete search history.

(56) References Cited

U.S. PATENT DOCUMENTS

| | | | | |
|---|---|---|---|---|
| 5,020,815 | A * | 6/1991 | Harris | A61G 5/1051 280/270 |
| 5,203,433 | A | 4/1993 | Dugas | |
| 6,092,824 | A | 7/2000 | Ritchie et al. | |
| 6,279,936 | B1 | 8/2001 | Ritchie et al. | |
| 6,371,503 | B2 | 4/2002 | Ritchie et al. | |
| 6,854,754 | B1 | 2/2005 | Easley, Jr. | |
| 6,916,032 | B2 * | 7/2005 | Wong | A61G 5/1024 280/250 |
| 7,434,825 | B2 | 10/2008 | Connors et al. | |
| 10,124,666 | B2 * | 11/2018 | Cunningham | A61G 5/025 |
| 10,548,785 | B2 * | 2/2020 | Vermij | A61G 5/021 |
| 11,523,953 | B2 * | 12/2022 | Morgan | A61G 5/101 |
| 2002/0153691 | A1 * | 10/2002 | Liao | A61G 5/023 280/250.1 |
| 2016/0270989 | A1 | 9/2016 | Yentzer et al. | |
| 2020/0155391 | A1 * | 5/2020 | Morgan | A61G 5/1035 |

(Continued)

*Primary Examiner* — James A Shriver, II
*Assistant Examiner* — Hilary L Johns
(74) *Attorney, Agent, or Firm* — Boyle Fredrickson S.C.

(57) ABSTRACT

The present invention provides an assembly having a collapsible wheelchair and an anti-rollback assembly to brake rotational movement of the wheelchair when a user is unseated, while simultaneously maintaining the ability of the wheelchair to collapse into a storage configuration. The anti-rollback assembly may include a brake bar pivotable between a lock state and an unlock state, a biasing member engaging the brake bar to exert a biasing force to move the brake bar into the lock state, and an actuator configured to engage a seat surface of the wheelchair to move the brake bar into the unlock state when the individual occupies the seat surface.

20 Claims, 6 Drawing Sheets

(56) References Cited

U.S. PATENT DOCUMENTS

| | | | | |
|---|---|---|---|---|
| 2020/0188201 | A1* | 6/2020 | McColl | A61G 5/1013 |
| 2022/0280362 | A1* | 9/2022 | Lokken | A61G 5/101 |

* cited by examiner

ANTI-ROLLBACK DEVICE FOR USE WITH A COLLAPSIBLE WHEELCHAIR

BACKGROUND OF THE INVENTION

The present invention relates to anti-rollback device for use with a wheelchair; and more specifically, relates to an anti-rollback assembly to brake rotational movement of a collapsible wheelchair when the seat is unoccupied while maintaining the ability of the wheelchair to collapse into a reduced width storage configuration.

Some individuals who require the use of a wheelchair may experience difficulty entering the wheelchair, i.e., ingressing, and/or rising from the wheelchair, i.e., egressing, the wheelchair arising from decreased physical strength or a temporary injury or ailment. Unintended movement of the wheelchair, such as the wheelchair rolling backwards while attempting to stand or sit may present further challenges to this process. To limit such undesirable wheelchair movement, conventional collapsible wheelchairs are typically equipped with lever actuated parking brake to keep the wheelchair stationary when the user is not seated and moving. However, use of a traditional wheelchair parking brake requires the user to both remember to activate the brake and the physical ability to do so. Physical injuries, decreased strength, and/or mental ailments may prevent a user from engaging the traditional wheelchair parking brake.

Prior attempts to assist such users in preventing undesirable rearward movement of the wheelchair include the use of electrically driven motors or hydraulic braking systems. These prior solutions may be heavy, cumbersome, and expensive and cannot operate in the absence of a power supply, such as an on-board battery. Alternative prior solutions have provided mechanical linkages that span the width of the wheelchair to brake rotation of both wheels from a single common drive member. When installed on a collapsible wheelchair, such prior solutions inhibit wheelchair's ability to fold or collapse into a reduced width storage configuration.

SUMMARY OF THE INVENTION

The present inventors have recognized that the seat, such as a flexible sling, holding an individual in a collapsing wheelchair can be enlisted as part of an actuator to control an anti-rollback mechanism. This is despite the inherently flexible nature of the sling and makes use of two independently operating actuators sensitive to lesser motion at the sides of the sling consistent with an individual sitting. By making use of the sling seat in this fashion, and anti-rollback system can be readily incorporated into a collapsing wheelchair with the actuator sufficiently separated so as not to interfere during the collapsing process. A similar benefit is obtained with other types of seats for collapsing wheelchairs.

In one embodiment, the present invention provides a collapsible wheelchair frame that is movable between a seating configuration and a collapsed storage configuration; a seat surface being affixed to the frame and a first and second wheel attached to the frame at left and right transversely opposed sides of the seat surface supporting the frame and positioned for rotation by the individual. The first and second anti-rollback assemblies are attached to the frame at left and right transverse opposed sides of the seat surface. Each anti-rollback assembly comprises a brake bar having a lock state engaging the corresponding first or second wheel to block rotation of the first or second wheel with respect to the frame and an unlock state disengaging the first or second wheel to allow unidirectional rotation of the first or second wheel with respect to the frame. A biasing member engages the brake bar to exert a biasing force to move the brake bar into the lock state. Two independently operating actuators engage the seat surface and are configured to exert a counter force opposite the biasing force on the brake bar to move the brake bar into the unlock state when the individual occupies the seat surface.

It is thus a feature of at least one embodiment of the invention to take advantage of the natural compliance of the seat in a folding wheelchair to provide an anti-rollback mechanism compatible with that folding mechanism.

In one embodiment, the seat surface maybe a flexible sling and the first and second actuators are positioned beneath a left and right side respectively of the flexible sling to be actuated together with downward displacement of the sling with a person centered on the sling.

It is thus a feature of at least one embodiment of the invention to provide a mechanism that can work with a sling seat commonly found in collapsible wheelchairs.

In one example, the first and second actuators maybe separated by a distance of at least 50% of a width of the sling when the frame is in the seating configuration.

The present inventors have recognized that greater mechanical precision possible with two independent actuators allow actuation with a reduced displacement that occurs near the edges of a sling seat allowing the actuators to be sufficiently separated so as not to interfere with collapsing of the wheelchair.

Each actuation arm may provide a contact surface abutting in underside of the sling when an individual is seated on the sling in the seating configuration and where in the contact surface is vertically adjustable with respect to the actuation arm to change in amount of movement of the actuation arm when an individual is seated on the sling.

It is thus a feature of at least one embodiment of the invention to allow actuation by the edges of a sling seat by fully exploiting downward travel of the seat.

In one embodiment, each actuator arm provides an elastomeric upper surface

It is thus a feature of at least one embodiment of the invention to minimize what might be uncomfortable upward pressure by the actuators both by separating the actuators (thereby reducing the force on the seat per actuator) and providing an elastomeric upper surface that can conform to the user to further reduce pressure points.

These and other features and aspects of the present invention will be better appreciated and understood when considered in conjunction with the following description and the accompanying drawings. It should be understood, however, that the following description, while indicating representative embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of the present invention, will become more readily apparent by referring to the exemplary, and therefore non-limiting, embodiments illustrated in the drawings accompanying and forming a part of this specification, wherein like reference numerals designate the same elements in the several views, and in which.

DETAILED DESCRIPTION

Figure 1:
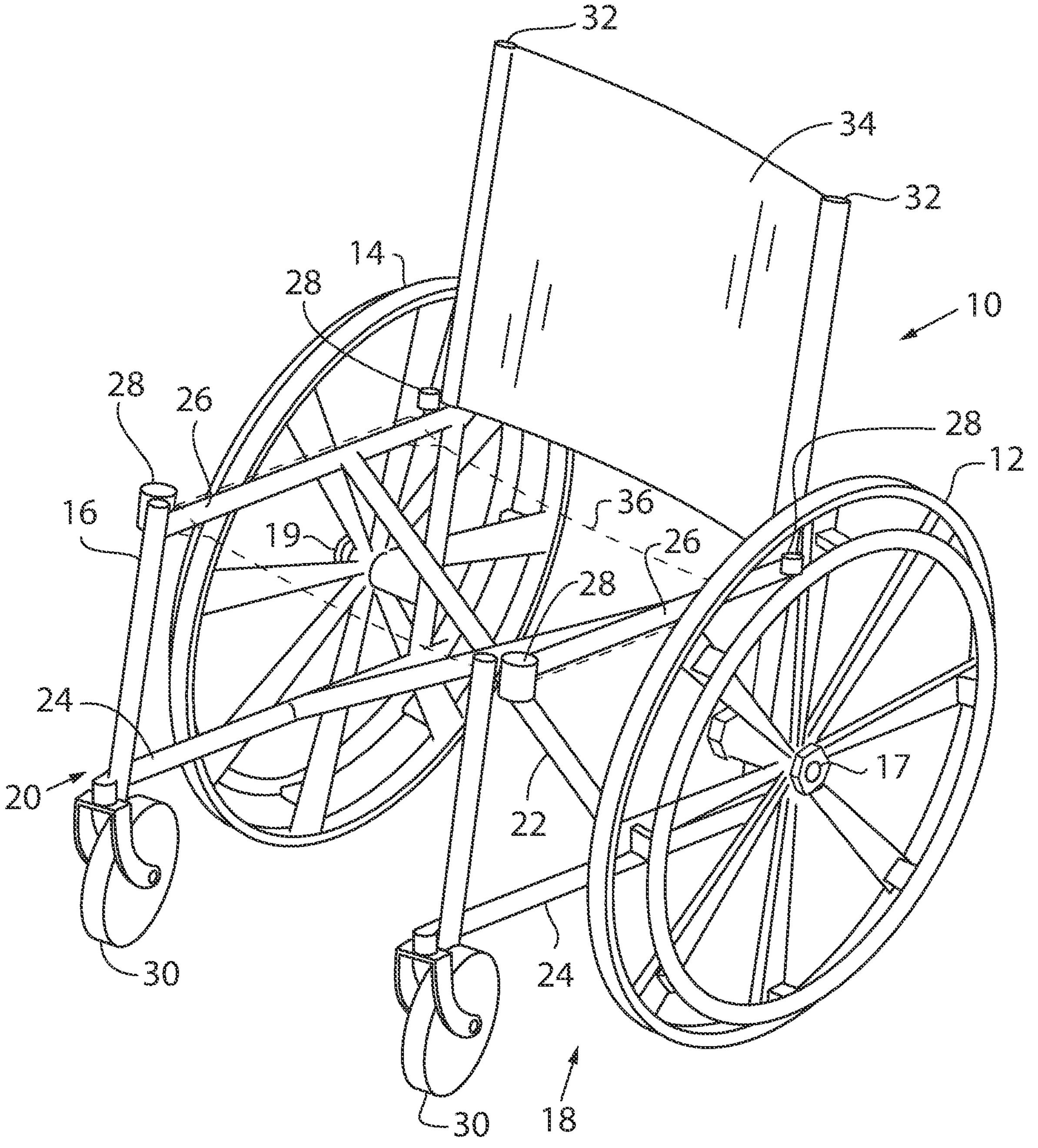
FIG. 1 is front-right perspective view of a collapsible wheelchair configured for use with an anti-rollback assembly according to one embodiment of the present invention.

Referring initially to FIG. 1, the general features of a folding or collapsible wheelchair 10 are shown in accordance with one embodiment of the present invention, including a first wheel 12 and a second wheel 14 located on opposing sides of a frame 16. The frame 16 includes first side frame subassembly 18 adjacent the first wheel 12 and a second side frame subassembly 20 adjacent the second wheel 14. The first wheel 12 is rotatably affixed to the frame 16 at hub 17, While the second wheel 14 is rotatably affixed to the frame 16 at hub 19. A cross frame 22 configured in the shape of an “X” extends between the first side frame subassembly 18 and the second side frame subassembly 20, wherein the cross frame 22 may include hinging members or pivots to collapse the wheelchair 10 such that the wheels 12, 14 are separated by a distance less than a width of the seating surface of the wheelchair 10. Each of the first and second frame subassemblies 18, 20 further includes an anti-tilt or first horizontal tube 24, affixed to a portion of the cross frame 22 at or near the bottom of the wheelchair frame 16, and a second horizontal tube 26, affixed to a second portion of the cross frame 22, above the first horizontal tube 24. In some embodiments, each subassembly 18, 20 of the wheelchair frame 16 may also include a third horizontal tube 28 (not shown in FIG. 1), positioned adjacent to or slightly above the second horizontal tube 26, which may traditionally function as a seat retention device. The wheels 12, 14, are generally affixed to the relative subassembly 18, 20, at or near the rear end of the first horizontal tube 24, while a castor wheel 30 may extend from an opposing front end of the first horizontal tube 24.

To brake the wheelchair 10, a standard lever actuated wheel lock, or parking brake (not shown in FIG. 1) may be mounted at or near the second horizontal tube 26, where downward motion on the handle forces a locking bar into frictional engagement with the outer surface of the corresponding wheel 12, 14. A vertical tube 32 generally extends perpendicular to the first 24, second 26 and third horizontal tubes, from the rear end of the first horizontal tube 24 to a distance above the third horizontal tube. The vertical tube 32 may terminate in a push handle and define an attachment location along its length for the seat hack 34, generally at a height above the second horizontal tube 26 or third horizontal tube (when present) which define an attachment location for a seat 36 such a flexible sling that is configured to bend of fold when the wheelchair 10 is collapsed. A removable armrest may be configured to extend above the second horizontal tube 26 through engagement with one or more sockets 28 positioned along the second horizontal tube 26 of each frame subassembly 18, 20.

In accordance with the wheelchair 10 shown in FIG. 1, the armrests are often grasped by the user when ingressing and/or egressing the wheelchair 10. However, as was described above, some users may neglect to engage the conventional wheel lock when ingressing and/or egressing the wheelchair 10. If the wheel lock was not engaged in a conventional wheelchair, the motion of the user sitting into or rising from the wheelchair 10 while grasping the armrests would result in a rearward applied force to the wheelchair 10 that would cause the chair to roll backwards, away from the user, making the process of ingressing and/or egressing increasingly difficult. One embodiment of an anti-rollback assembly 38 that automatically brakes rotation of the wheels 12, 14 in the absence of a seated user while also maintaining collapsibility of the wheelchair 10 will now be described in detail below.

Figure 2:
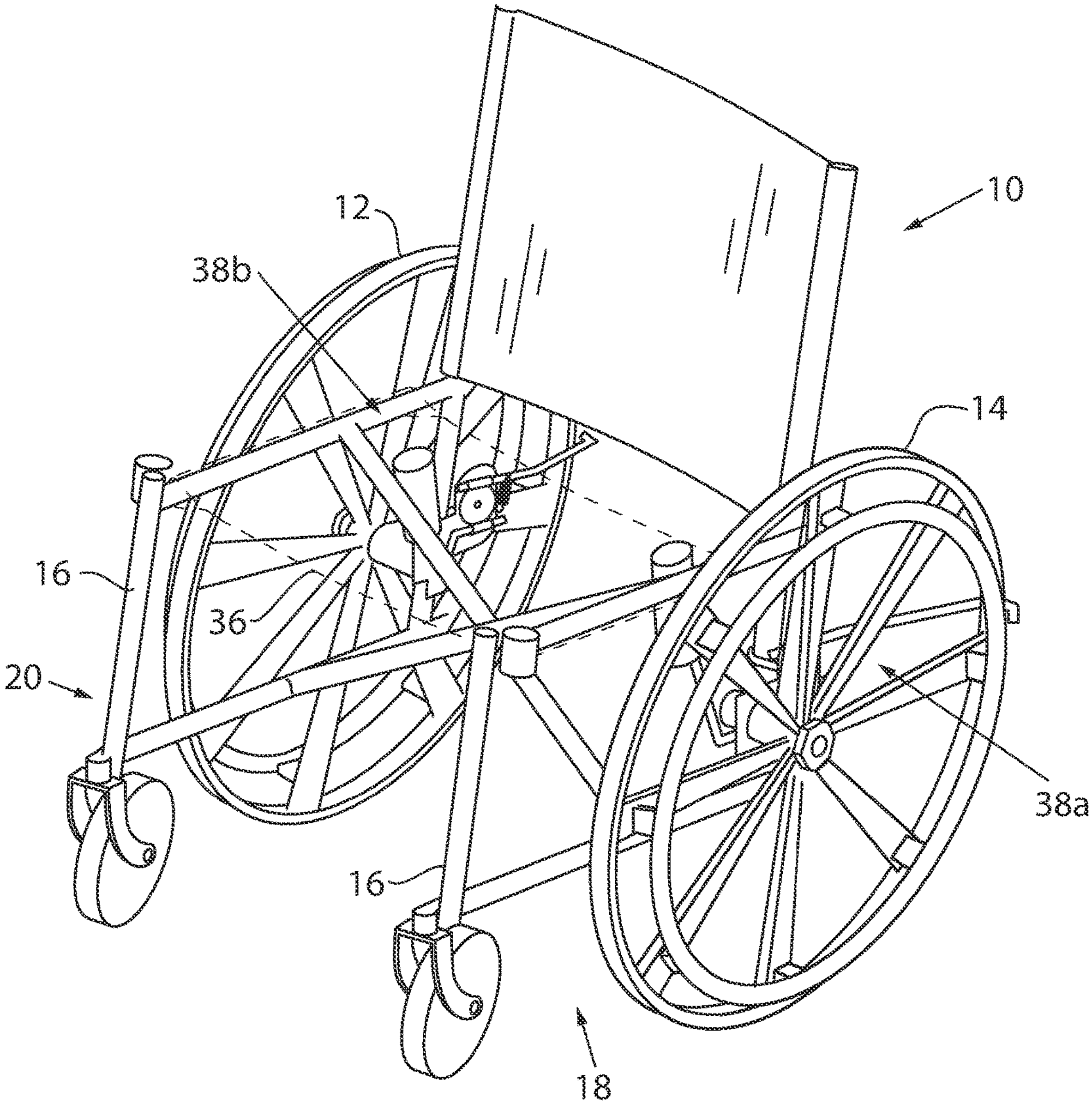
FIG. 2 is a front-right perspective view of the collapsible wheelchair of FIG. 1 in including a first and second anti-rollback device according to one embodiment of the present invention.
Figure 3:
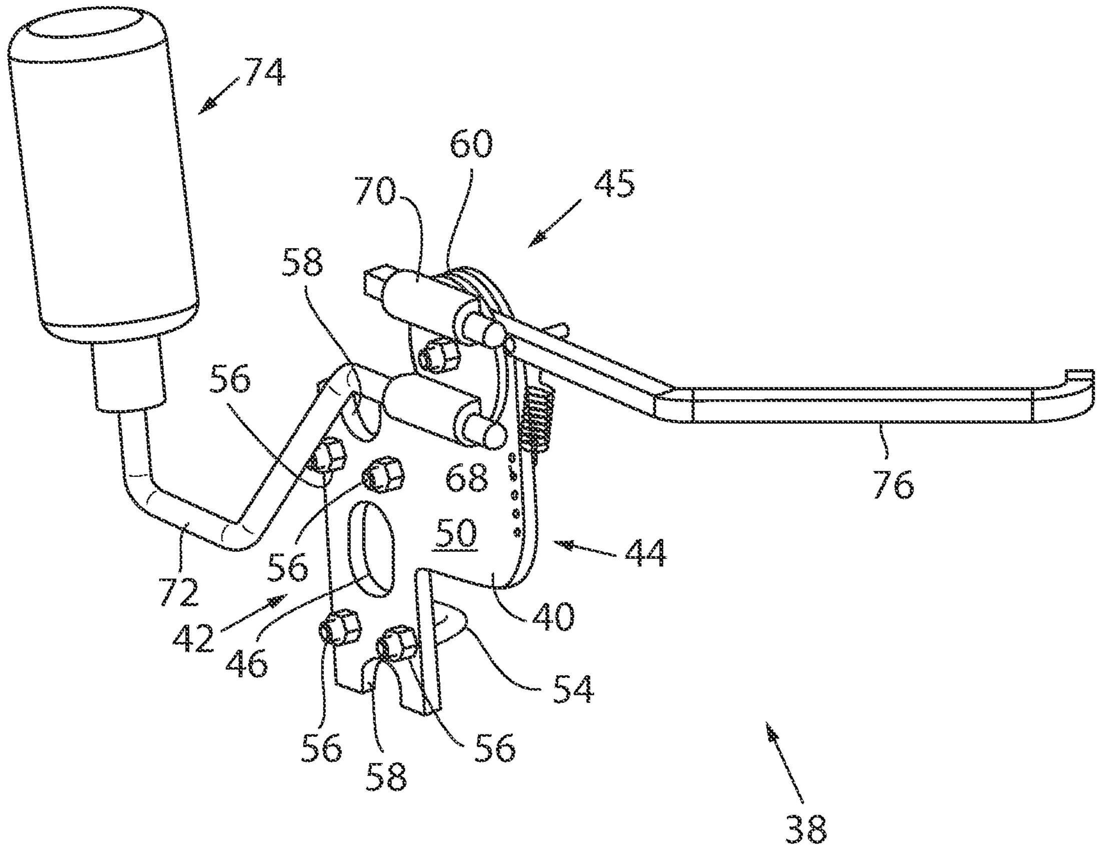
FIG. 3 is a rear-right prosecutive view of anti-rollback device according to one embodiment of the present invention.
Figure 4:
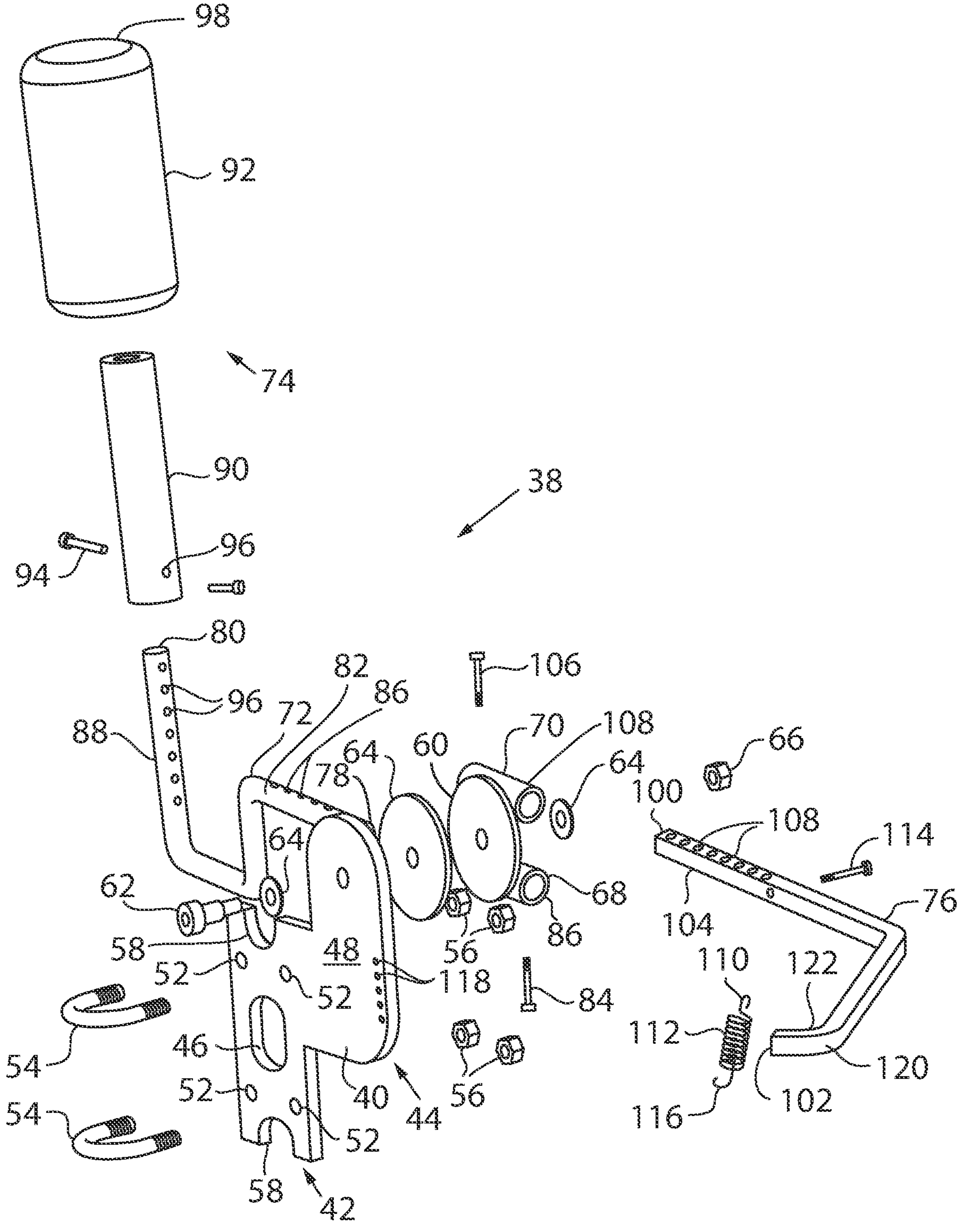
FIG. 4 is a front left exploded view of an opposing anti-rollback device according to one embodiment of the present invention.

Turning now to FIGS. 2-4, and initially FIG. 2, the collapsible wheelchair 10 is shown with a first anti-rollback assembly **38*a* mounted to the first side frame subassembly 18 adjacent the first wheel 12 and a second anti-rollback assembly 38*b* mounted to the second side frame subassembly 20 adjacent the second wheel 14. As shown in FIG. 2, and described in further detail below, each anti-rollback assembly 38 has an outer width less than half of the internal width of the wheelchair 10 when in the folded or inwardly collapsed space saving storage configuration. Accordingly, the wheelchair 10 as shown in FIG. 2 is well configured to maintain its ability to fold into an inwardly collapsed space saving storage configuration while simultaneously retaining an anti-rollback assembly 38 mounted to both the first side frame subassembly 18 adjacent the first wheel 12 and a second side frame subassembly 20 adjacent the second wheel 14**.

Referring now to FIGS. 3 the second anti-rollback assembly **38*b* is illustrated in further detail in the absence of collapsible wheelchair 10. Assembly 38*b*, which is configured to mounted to the second side frame subassembly 20 adjacent the second wheel 14 is illustrated in an assembled view in FIG. 3. A corresponding exploded view of assembly 38*a*, which is configured to mounted to the first side frame subassembly 18 adjacent the second wheel 12 is shown FIG. 4. It should be understood that opposing assemblies 38*a* and 38*b* are mirror images of one another. The following description of assembly 38 applies equally to assemblies 38***a* and 38*b*, but for the lateral orientation of their relative components.

The anti-rollback assembly 38 includes a mounting plate 40 having a front end 42 configured to engage the frame 16 of the wheelchair 10 and a rear end 44 configured to receive the pivoting linkage 45. The front end 42 of the plate 40 includes a hub aperture 46 extending through the width of the plate 40, from and outer surface 48 of the plate 40 to an opposing inner surface 50. The hub aperture 46 is sized to allow an inner portion of the wheelchair hub 19 to pass into or through the hub aperture 46. During assembly and/or installation, positioning of the outer surface 48 of the plate 40 along the interior of the wheelchair frame 16 and the wheelchair hub 19 within the hub aperture 46 provides proper positioning and indexing of the assembly 38 relative to the wheelchair 10. The front end 42 of the plate 40 further includes a first set of mounting apertures 52 positioned above the hub aperture 46, and a second set of mounting apertures 52 below the hub aperture 46. When mounting the assembly 38 to the wheelchair 10, a bolt, such as a rounded U-bolt 54 as shown, may encircle the vertical tube 32 of the wheelchair 10, where its opposing threaded ends then pass through corresponding mounting apertures 52 and are secured by threaded. fasteners 56. However, it should be understood that alternative mounting devices, such as worm gear clamps, zip-ties, etc. are considered well within the scope of the invention. To accommodate installation with a variety of wheelchairs 10, the front end 42 of the plate 40 may also include one or more arcuate recesses 58 disposed about its peripheral edges as to accommodate variable height mounting of the assembly 38 and/or the passage of tube members from the frame 16 of the wheelchair 10.

Turning now to the rear end 44 of the plate 40, a pivoting linkage 45 is rotatably affixed to the upper end of the plate 40, relatively higher than the wheelchair hub 19. The linkage 45 includes a pivoting bracket 60 that is rotationally affixed to the rear end 44 of the plate 40 about a bolt 62. Bolt 62 provides a rotational axis about which the pivoting bracket 60 rotates, relative to the fixed plate 40. One or more washers 64 may be disposed about the bolt 66 to reduce rotational friction within the linkage 45, and a threaded fastener may be positioned opposite the bolt head to retain the pivoting bracket 60 to the plate 40.

Still referring to FIG. 3, a first collar 68 and a second collar 70 extend from the inner surface of the pivoting bracket 60 as illustrated. In this configuration, the collars 68, 70 are generally parallel to one another and have a longitudinal axis oriented generally perpendicular to that of bolt 62. The first collar 68 is configured to receive an actuator arm 72 that extends forwardly from the collar 68 to a scat actuator 74, as will be described below. The second collar 70 is configured to receive and retain therein a brake bar 76 that extends rearwardly from the collar 70 to engage a rear portion of the corresponding wheelchair wheel 12, 14. Generally, the actuator arm 72 and brake bar 76 will pivot in a seesaw fashion about the rotational axis of the bolt 62. As such, when the actuator 74 is downwardly depressed, rotational movement is translated through the actuator arm 72 to raise the opposing brake bar 76 out of engagement with the wheel 12, 14. Inversely, when the actuator 74 rises, the pivoting linkage 45 will result in the brake bar 76 lowering into a movement braking engagement with the corresponding wheel 12, 14. In one embodiment, engagement of the brake bar 76 inhibits forward and rearward rotation of the corresponding wheel 12, 14, such that the wheelchair 10 remains stationary when the user is not seated, In an alternative embodiment, the brake bar 76 is configured to inhibit only rearward rotation of the corresponding wheel 12, 14. In such an alternative embodiment, the wheelchair 10 will be inhibited from rolling backwards but may still roll forwards when the brake bar 76 is engaged such that an individual could push the unoccupied wheelchair 10 forward.

More specifically, referring now to FIG. 4, the actuator arm 72 extends from a first end 78 that is received within the collar 68 to an opposing second end 80 that receives the actuator 74. As shown in FIG. 4, the arm 72 may not be linear along its entirety but rather include one or more bends or angles, which define discrete linear segments along the length of the arm 72. A first arm segment 82 located adjacent the first end 78 of the arm 72 is configured to be slidably received within the first collar 68. A mounting pin 84 may extend through overlapping apertures 86 in the collar 68 and first arm segment 82. A plurality of the apertures 86 spaced at intervals along the length of the first arm segment 82 allow for a variable length of the arm 72 to be secured to collar 68. This variable positioning of the attachment of the arm 72 relative to the collar 68 allows one to adequately adjust the position of the actuator 74 for a variety of wheelchairs 10 of various depth dimensions.

Still referring to FIG. 4, a second arm segment 88 may be located adjacent the second end 80 of the actuator arm 72. As shown in FIG. 4, the second arm segment 88 may be generally perpendicular to the first arm segment 82, such that when installed on a wheelchair 10, the first arm segment 82 is generally horizontal relative to the base supporting the wheelchair 10, and the second segment 88 is generally vertical. The second arm segment 88 is configured to slidably receive the actuator 74, which may comprise an inner core 90 and an outer sheath 92. The core 90 is generally cylindrical and is configured to be slidably disposed along the second arm segment 88 in a telescopic fashion. A mounting pin 94 may extend through overlapping apertures 96 in the inner core 90 a second arm segment 88 to secure the actuator 74 to the arm 72. A plurality of the apertures 96 spaced at intervals along the length of the second arm segment 88 allow for the variable height of the actuator 74 to be secured to the arm 72. This variable position of the attachment of the arm 72 to the inner core 90 allows one to adequately adjust the position of the actuator 74 for a variety of wheelchairs 10 of various height dimensions.

Figure 6:
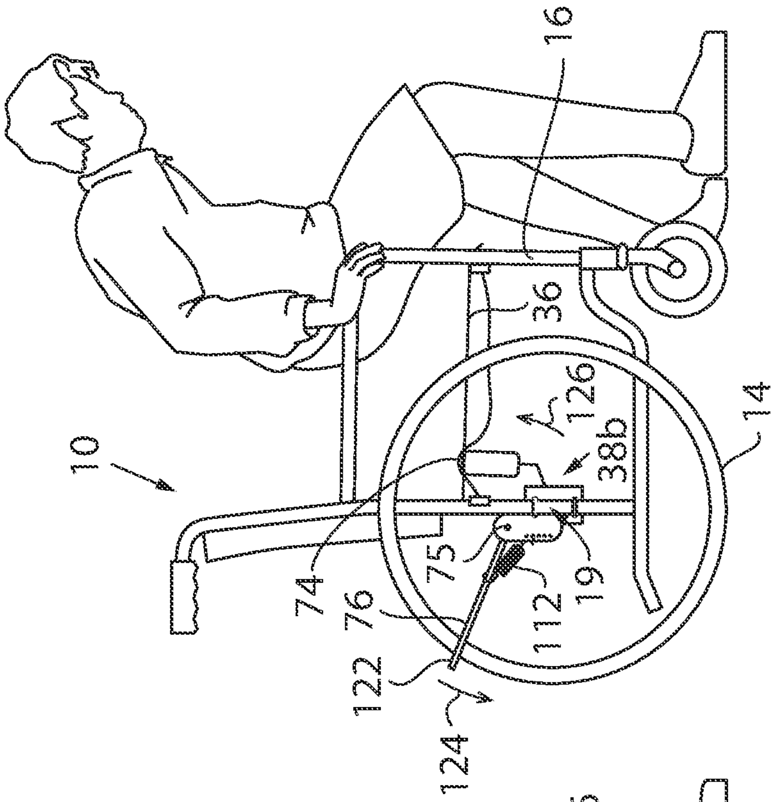
FIG. 6 is a side profile view of an unseated individual user rising from a collapsible wheelchair with an anti-rollback device according to one embodiment of the present invention in a locked state.
Figure 5:
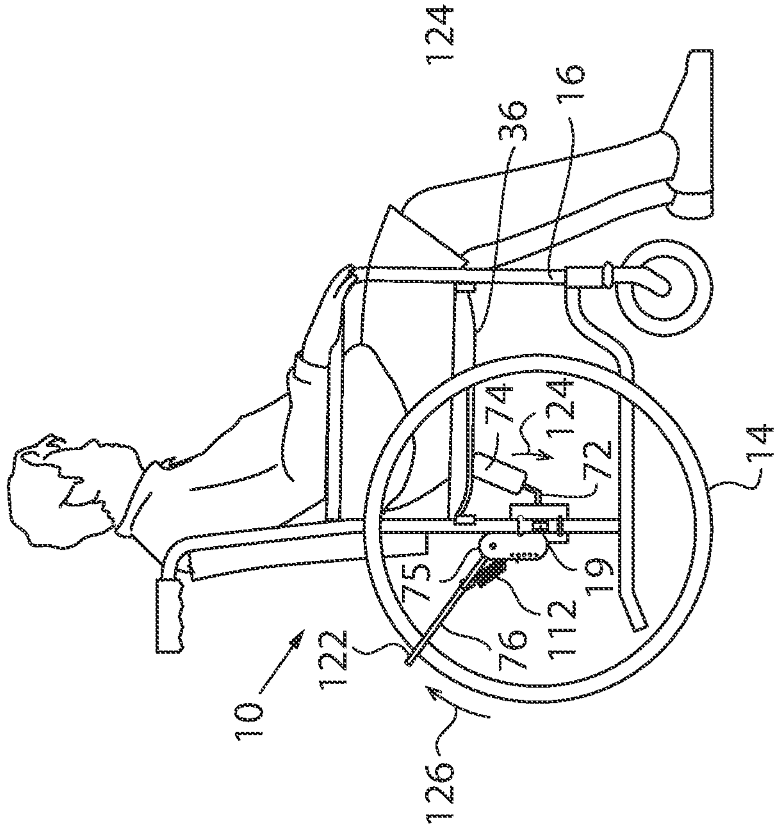
FIG. 5 is a side profile view of an individual user seated in a collapsible wheelchair with an anti-rollback device according to one embodiment of the present invention in an unlocked state.
Figure 7:
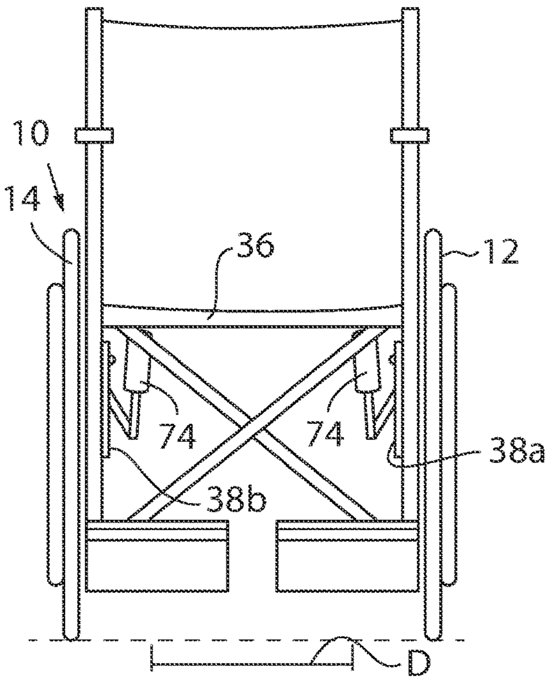
FIG. 7 is front view of the wheelchair of FIG. 5, including a first and second anti-rollback device according to one embodiment of the present invention, with the chair in an expanded seating configuration.

As illustrated in FIG. 4, the arm 72 may include one or more additional arm segments or bends located between the first and second segments 72, 88. The additional segment and bends are configured to accommodate the location of the actuator 74 below the wheelchair seat 36 while placing the pivot linkage 45 above and rearward of the hub 17, 19 of the corresponding wheel 12, 14. Furthermore, as shown in FIGS. 5-7, a longitudinal axis of the actuator 74 may be inclined approximately between 2° and 12°, and more preferably approximately 7° relative to the longitudinal axis of the vertical tube 32 of the wheelchair 10. By angling the actuator 74, a top surface 98 of the actuator sheath 92 may be ergonomically adjusted to tangentially contact the bowed underside of the wheelchair's flexible or sling style seat 36 as to limit the formation of undesirable pressure points during use. Furthermore, the angled actuator 74 allows for the actuator arm 72 to be distally positioned as to avoid interference with the stride of a person that is pushing the wheelchair 10 from the rear.

As was described above, when the actuator 74 is downwardly depressed, rotational movement is translated through the actuator arm 72 to raise the opposing brake bar 76 out of engagement with the wheel 12, 14. Accordingly, the actuator 74, and specifically the top surface 98 of the outer sheath 92 of the actuator 74 is configured to be positioned below the underside of the seat 36 of the wheelchair 10. Accordingly, when in use, the downward depression of the seat 36 of the wheelchair 10 resulting from a user ingressing or sitting down into the wheelchair 10 will contact the top surface 98 of the sheath 92 of the actuator 74 to initiate disengagement of the anti-rollback assembly 38. The top surface 98 may have a surface area of approximately between 7 in sq and 1.7 in sq, and more preferably approximately 2.7 in sq, as to provide a sufficiently large contact area without encumbering the ability of the wheelchair 10 to fold or collapse into a reduced width storage configuration. The outer sheath 92 is preferably formed of a pliable or resilient material such as polyurethane foam or rubber to present a cushioned surface to the user below the seat 36. The core 90 may be formed of a rigid metal or molded plastic having a weight of approximately between 30 g and 6 g, and more preferably approximately 43 g, as to provide a counterweight to the brake bar 76. More specifically, as each of the two laterally opposed side frame subassemblies 18, 20 of the wheelchair 10 may be equipped with an individual anti-rollback assembly 38*a*, 38*b*, each corresponding actuator 74 is configured to engage the user independently. That is to say, that as the user sits into the wheelchair 10, the actuators 74 of both anti-rollback assembly 38*a* and 38*b* will be independently depresses in order to disengage their corresponding anti-rollback assemblies 38*a* and 38*b*. This independent actuation of each assembly 38*a*, 38*b* provides the additional advantage of maintaining a brake on one wheel 12, 14 in the event that the standing and/or sitting user applies force disproportionately along the wheelchair seat 36. For example, if an injured user sat in a wheelchair while favoring his or her right side and depressed the actuator 74 for the anti-rollback assembly 38*a* affixed to the first side frame subassembly 18 of the wheelchair, before being fully seated, the opposing anti-rollback assembly 38*b* would maintain a brake on wheel 14 as to prevent wheelchair 10 movement until the user was fully seated.

Returning now to FIGS. 3 and 4, the second collar 70 extending from the inner surface of the pivoting bracket 60 is configured to receive and retain therein the brake bar 76 that extends rearwardly from the collar 70 to engage a rear portion of the corresponding wheelchair wheel 12, 14. The brake bar 76 extends rearwardly from a first end 100 that is received within the collar 70 to an opposing second end 102. As shown in FIG. 4, the bar 76 may not be linear along its entirety but rather bent or even J shaped with a plurality of bends located along its length. A first bar segment 104 located adjacent the first end 100 of the bar 76 is configured to be slidably received within the second collar 70. A mounting pin 106 may extend through overlapping apertures 108 in the collar 70 and first bar segment 104. A plurality of the apertures 108 spaced at intervals along the length of the first bar segment 104 allow for a variable length of the bar 76 to be secured to collar 70. This variable positioning of the attachment of the bar 76 relative to the collar 70 allows one to adequately adjust the position of the bar 76 for a variety of wheelchairs 10 of various depth dimensions and wheel sizes.

A first end 110 of a tension cod return spring 112 is also affixed to a mounting pin 114 located distal to the plurality of apertures 108 spaced at intervals along the length of the first bar segment 104. The opposing second end 116 of the spring 112 is configured to be mounted to one of a plurality of mounting apertures 118 located below the pivoting bracket 60 at the rear end 44 of the mounting plate 40. As shown in FIG. 3, the plurality of mounting apertures 118 are vertically arranged such that use of the top most aperture 118 provides the shortest length of the spring 112, with relatively less return force applies to the bar 76, while the lowest mot aperture 118 requires the spring 112 the spring to be stretched to its greatest length, with relatively more return force applies to the bar 76. In one embodiment of the present invention, the return spring 112 may exert approximately between 30 N and 62 N of force on the bar 76, which is sufficient to overcome the weight of the actuator 74 and drive the bar into a braking configuration in contact with the wheel 12, 14 as described below.

Returning now to FIG. 4, a second bar segment 120 may be located adjacent the second end 102 of the brake bar 76. As shown in FIG. 4, the second bar segment 120 may comprise a front surface 122 that is configured to contact and frictionally engage the outer surface of the wheel 12, 14 when the brake bar 76 is lowered into a braking configuration as a result of the user egressing the wheelchair 10. The front surface 122 may have an arcuate cross-section that is configured to mate with the rounded outer surface of the wheel 12, 14 and increase the surface area in contact therewith. As shown generally in FIGS. 5 and 6, the pivoting linkage 75 and specifically the brake bar 76 are mounted at a height above the hub 17, 19 of each wheel 12, 14, respectively. In this configuration, the front surface 122 is configured to engage the outer surface of the wheel 12, 14 at a point above the vertical midline of the wheel 12, 14. That is to say, as shown in FIG. 6, the rising or egress of a user from the wheelchair seat 36, will disengage the actuator 74 that overrides the return spring 112. As a result, the force exerted by the return spring 112 will pivot the brake bar 76 downward in direction 124 while the actuator pivots in the opposite direction 126, in a seesaw fashion about the pivoting bracket 160. Given the position of the brake bar 76 above the horizontal midline of the wheel 12, 14, a downward movement of the brake bar 76 driven by return spring 112 forces the front surface 122 of the second bar segment 120 to contact and frictionally engage the outer surface of the wheel 12, 14 in order to brake the wheelchair 10.

In contrast, when a user is seated in the wheelchair 10 as shown in FIG. 5, the flexible or otherwise movable seat 36 extends downwardly, where the actuator 74 travels downward in the opposite direction 124. As a result, a seating force of approximately between 45 N and 90 N or greater exerted by the seated user will overcome the return spring 112 and pivot the brake bar 76 upwards in direction 126 in a seesaw fashion about the pivoting bracket 160, and out of a frictional engagement with the wheel 12, 14. In one embodiment of the present invention, the front surface 122 provides a clearance of approximately between 2 mm and 15 mm and more preferably 5 mm from the outer surface of the wheel 12, 14 when in the disengaged configuration shown in FIG. 5. This relatively small magnitude of clearance allows the wheel 12, 14 to rotate freely while simultaneously providing rapid deployment of the brake bar 76 to pivot into a frictional engagement with the wheel 12, 14 while the user is still in the process of ingressing or egressing the wheelchair. Such rapid deployment of the anti-rollback system 36 braking of the wheelchair 10 allows the user to exert a force on the wheelchair handle to assist in sitting and standing without the wheelchair 10 rolling backwards.

Figure 8:
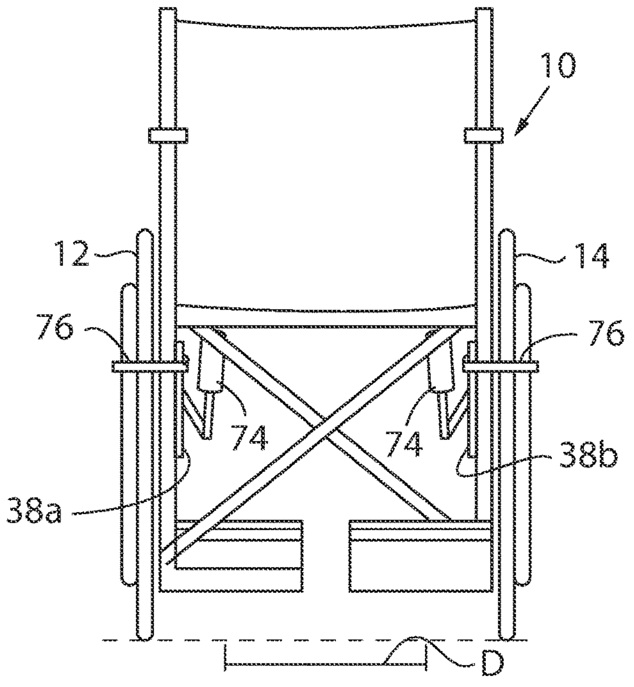
FIG. 8 rear view of the wheelchair of FIG. 5, including a first and second anti-rollback device according to one embodiment of the present invention, with the chair in an expanded seating configuration; and, FIG. 9 is front view of the wheelchair of FIG. 5, including a first and second anti-rollback device according to one embodiment of the present invention, with the chair in a collapsed storage configuration.
Figure 9:
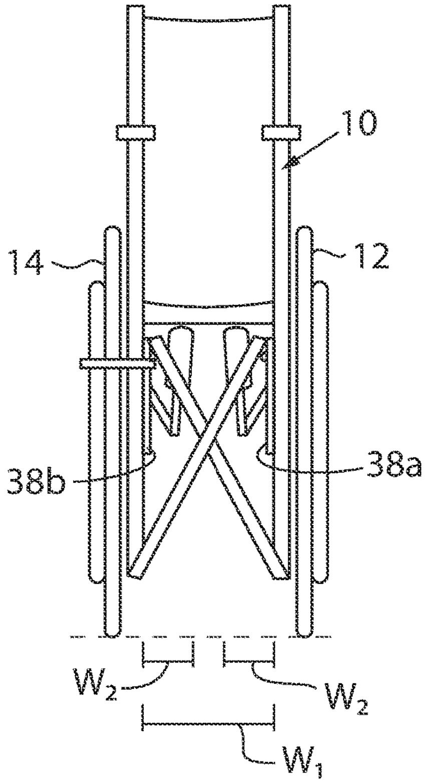

Turning now to FIGS. 7-9, the first and second anti-rollback assemblies 38*a*, 38*b* are shown in use where they have been attached to a collapsible or folding wheelchair 10. When in use, the wheelchair 10 is configured to fold or collapse inwardly in a space saving storage configuration. As was previously described, the outer width of the first and second anti-rollback assemblies 38*a*, 38*b* may be sufficiently narrow as to prevent the assembly 38 from impeding or inhibiting the folding mechanism of a conventional collapsible wheelchair. As shown in FIG. 9, in a folded configuration, the wheelchair 10 provides an internal width "$W_1$" that extends from the inner surface of one wheel 12 to the inner surface of the opposing wheel 14. The two mounted assemblies 38 each preferably exhibit a width "$W_2$" that is less than or equal to one half of the internal width "$W_1$", i.e., $W_1 \leq W_2/2$. In such an embodiment, mounting of two anti-rollback assemblies 38 would not inhibit closure or folding of the wheelchair 10.

It should be understood that wheelchair 10 dimensions, frame 72 construction, and wheel 82 size may vary amongst manufactures and models. By way of one non limiting example, a representative wheelchair 10, such as the Tracer EX2™ manufactured by Invacare of Elyria, Ohio has a wheel 12, 14 diameter of approximately 24 inches and has an unfolded internal width of between 16 inches to 20 inches, and a folded width $W_1$ of approximately 13 inches. Accordingly, in one embodiment of the present invention, the anti-rollback assembly 38 as a width $W_2$ of preferably approximately less than 6.5 inches and more preferably between 2.5 inches and 3.5 inches. Accordingly, when the wheelchair 10 is in an unfolded configuration, as shown in FIGS. 7 and 8, the anti-rollback assemblies 38*a*, 38*b* are separated by as distance "D" of approximately more than 9.5 inches and more preferably approximately between 10 inches and 15 inches as to avoid interference with the stride of a person that is pushing the wheelchair 10 from the rear.

Many other changes and modifications could be made to the invention without departing from the spirit thereof. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention.

We claim:

1. A collapsible wheelchair assembly, comprising:

a collapsible frame movable between a seating configuration having a first width and a collapsed storage configuration having a second width less than the first width;

a seat affixed to the frame and configured for supporting an individual when the frame is in the seating configuration;

a first and second wheel attached to the frame at left and right transversely opposed sides of the seat surface supporting the frame and positioned for rotation by the individual;

a first and second anti-rollback assembly attached to the frame at left and right transverse opposed sides of the seat;

each of the first and second anti-rollback assemblies comprise:

a brake bar having a lock state engaging the corresponding first or second wheel to block unidirectional rotation of the first or second wheel with respect to the frame and an unlock state disengaging the first or second wheel to allow unidirectional rotation of the first or second wheel with respect to the frame, and a biasing member engaging the brake bar to exert a biasing force to move the brake bar into the lock state, the first and second anti-rollback assemblies further providing a respective first and second actuator independently engaging the seat configured to exert a counter force opposite the biasing force on the brake bar to move the brake bar into the unlock state when the individual occupies the seat; and wherein the actuators of the first and second anti-rollback assemblies are positioned beneath a left and right side respectively of the seat to be actuated with downward displacement of the seat upon the individual sitting on the seat.

2. The collapsible wheelchair assembly of claim 1, wherein the collapsible frame has a first distance between an inner surface of the first wheel and the inner surface of the second wheel when the collapsible frame is in a collapsed storage orientation, and wherein each of the first and second anti-rollback assemblies has an outer width less than or equal to 50 percent of the first distance.

3. The collapsible wheelchair assembly of claim 1, wherein each of the first and second anti-rollback assemblies further comprise an actuation arm supporting the corresponding actuator and wherein each actuator provides a contact surface abutting an underside of the seat when the individual occupies the seat in the seating configuration, the contact surface being vertically adjustable with respect to the corresponding actuator arm.

4. The collapsible wheelchair assembly of claim 3, wherein the contact surface of each actuator is elastomeric.

5. The collapsible wheelchair assembly of claim 1, wherein the seat is a flexible sling having left and right edges fixed to the frame and folding inward when the collapsible frame moves to the collapsed storage configuration.

6. The collapsible wheelchair assembly of claim 1, wherein each of the first and second anti-rollback assemblies further comprise a pivotable linkage extending from the actuator to the brake bar.

7. The collapsible wheelchair assembly of claim 6, wherein the pivotable linkage comprises a pivoting bracket and an actuator arm extending forwardly of the bracket, the actuator arm having a first end engaging the bracket and an opposing second end receiving the actuator.

8. The collapsible wheelchair assembly of claim 7, wherein the actuator arm is adjustably retained at the bracket as to variably position the bracket along a length of the arm.

9. The collapsible wheelchair assembly of claim 6, wherein the brake bar extends rearwardly of the bracket, the brake bar having a first end engaging the bracket and an opposing second end configured to engage the first or second wheel.

10. The collapsible wheelchair assembly of claim 6, wherein each of the first and second anti-rollback assemblies further comprise a mounting plate configured to be affixed to the collapsible frame, the mounting plate providing a rotational axis at a height greater than a hub of the first or second wheel, about which the pivotable linkage rotates.

11. The collapsible wheelchair assembly of claim 10, wherein the biasing member extends from a first end affixed to the brake bar to a second end affixed to the mounting plate.

12. The collapsible wheelchair assembly of claim 11, wherein the second end of the biasing member is received at one of a plurality of attachment points positioned at the mounting plate.

13. The collapsible wheelchair assembly of claim 1, wherein each of the first and second anti-rollback assemblies has an outer width of less than or equal to approximately 3.5 inches.

14. A collapsible wheelchair assembly, comprising:

a collapsible frame movable between a seating configuration having a first width and a collapsed storage configuration having a second width less than the first width;

a seat surface affixed to the frame and configured for supporting an individual when the frame is in the seating configuration;

a first and second wheel attached to the frame at left and right transversely opposed sides of the seat surface supporting the frame and positioned for rotation by the individual;

at least one anti-rollback assembly attached to the frame at one side of the seat surface;

each of the at least one anti-rollback assemblies comprise:

a brake bar having a lock state engaging one of the first or second wheels to block rotation of the wheel with respect to the frame and an unlock state disengaging the wheel to allow unidirectional rotation of the wheel with respect to the frame, a biasing member engaging the brake bar to exert a biasing force to move the brake bar into the lock state, and an actuator engaging the seat surface configured to exert a counter force opposite the biasing force on the brake bar to move the brake bar into the unlock state when the individual occupies the seat surface, wherein the collapsible frame has a first distance between an inner surface of the first wheel and the inner surface of the second wheel when the collapsible frame is in a collapsed storage orientation, and wherein the outer width of each of the at least one anti-rollback assemblies is less than or equal to 50 percent of the first distance.

15. The collapsible wheelchair assembly of claim 14, wherein each of the at least one anti-rollback assemblies has an outer width of less than or equal to approximately 3.5 inches.

16. The collapsible wheelchair assembly of claim 14, wherein each of the at least one anti-rollback assemblies further comprises a pivotable linkage extending from the actuator to the brake bar.

17. The collapsible wheelchair assembly of claim 16, wherein the pivotable linkage comprises a pivoting bracket rotatably affixed to a mounting plate at a height greater than a hub of the wheel, and a non-linear arm extending forwardly of the bracket, the non-linear arm having a first end engaging the pivoting bracket and an opposing second end receiving the actuator.

18. A wheelchair anti-rollback kit configured to brake rotational movement of a collapsible wheelchair when an individual is unseated while rising from and/or sitting into the collapsible wheelchair, comprising:

at least one anti-rollback assembly configured to be attached to a frame of the collapsible wheelchair, each of the at least one anti-rollback assemblies having a width less than 50 percent of a width of the wheelchair in a collapsed storage configuration;

each of the at least one anti-rollback assemblies comprise:

a brake bar having a lock state configured to engage a corresponding first or second wheel of the collapsible wheelchair to block rotation of the wheel with respect to the frame and an unlock state disengaging the first or second wheel to allow unidirectional rotation of the wheel with respect to the frame, a biasing member engaging the brake bar to exert a biasing force to move the brake bar into the lock state, and an actuator configured to engage a seat surface of the wheelchair to exert a counter force opposite the biasing force on the brake bar to move the brake bar into the unlock state when the individual occupies the seat surface.

19. The wheelchair anti-rollback kit of claim 18, wherein each of the at least one anti-rollback assemblies has an outer width of less than or equal to approximately 3.5 inches.

20. The wheelchair anti-rollback kit of claim 18, wherein each of the at least one anti-rollback assemblies comprise a first anti-rollback assembly configured to engage the first wheel and a second anti-rollback assembly configured to engage the second wheel.

* * * * *